United States Patent [19]
Bloch

[11] 3,835,197
[45] Sept. 10, 1974

[54] PREPARATION OF POLYCYCLIC COMPOUNDS

[75] Inventor: Herman S. Bloch, Skokie, Ill.

[73] Assignee: Universal Oil Products Company, Des Plaines, Ill.

[22] Filed: Nov. 29, 1972

[21] Appl. No.: 310,498

[52] U.S. Cl. .................................. 260/666 PY
[51] Int. Cl. ................................... C07c 13/28
[58] Field of Search ........................ 260/666 PY

[56] References Cited
UNITED STATES PATENTS

| | | | |
|---|---|---|---|
| 3,557,072 | 1/1971 | Vergne et al. | 260/666 PY |
| 3,646,105 | 2/1972 | Cesca et al. | 260/666 PY |
| 3,661,869 | 5/1972 | Greco et al. | 260/666 PY |
| 3,725,366 | 4/1973 | Amiard et al. | 260/80.78 |

*Primary Examiner*—Veronica O'Keefe
*Assistant Examiner*—Veronica O'Keefe
*Attorney, Agent, or Firm*—James R. Hoatson, Jr.; Raymond H. Nelson; William H. Page, II

[57] ABSTRACT

Polycyclic dienic compounds may be prepared by the thermal reaction of a conjugated cyclic diene such as 1,3-cyclopentadiene with a non-conjugated cyclic diene such as 1,4-cyclohexadiene.

10 Claims, No Drawings

PREPARATION OF POLYCYCLIC COMPOUNDS

This invention relates to a polymerization process for the preparation of a polycyclic dienic compound by polymerizing a conjugated cyclic diene with a non-conjugated cyclic diene. More specifically this invention is concerned with the thermal polymerization of a conjugated cyclic diene and a non-conjugated cyclic diene.

It has been shown in the prior art that elastomers may be obtained from the polymerization of conjugated non-cyclic dienes and dihydroaromatic compounds in the presence of an alfin catalyst such as a mixture of sodium isopropoxide, allyl sodium and sodium chloride. For example, an elastomer is formed from the polymerization of 1,3-butadiene and 1,4-dihydrobenzene in the presence of an alfin catalyst of the type hereinbefore set forth at atmospheric pressure and room temperature.

In contradistinction to the catalytic process of the prior art, the present invention is concerned with the polymerization of a conjugated cyclic diene and a non-conjugated cyclic diene in a thermal manner at a temperature of from about 100° C. to about 175° C. This novel process will allow a more inexpensive method in preparing the desired polycyclic dienic compound as a result of eliminating the necessity for the use of a catalyst and the subsequent separation of the product comprising a polycyclic diene polymer from the catalyst. By eliminating the aforesaid use of a catalyst and necessity for relatively expensive catalyst separation means, the process of this invention will be permitted to be effected in a commercially attractive and economically feasible manner by materially reducing the overall cost of producing the desired product. The temperature at which the thermal reaction is effected is not such that it would involve any large expense in fabricating and maintaining the requisite equipment necessary for effecting the reaction.

The desired products of the process of this invention, namely, the polymerized cyclic dienic compounds are utilized in the chemical industry in many ways. Some specific examples of the ways in which these compounds may be used include their use as plasticizers, rubber additives, viscosity improvers, components of adhesives and calking compounds.

It is therefore an object of this invention to provide a process for the preparation of polycyclic dienic compounds.

A further object of this invention is to provide a process for the preparation of a polycyclic dienic compound in a thermal process.

In one aspect an embodiment of this invention resides in the process for the preparation of a polycyclic dienic compound which comprises polymerizing a conjugated cyclic diene with a non-conjugated cyclic diene and recovering the resultant polymerized cyclic dienic compounds.

A specific embodiment of this invention resides in preparing a polycyclic diene which comprises reacting 1,3-cyclopentadiene with 1,4-cyclohexadiene at a temperature in the range of from about 100° to about 175° C. in an inert hydrocarbon medium, and recovering the resultant product.

Another specific embodiment of this invention resides in a process for preparing a polycyclic dienic compound which comprises reacting 1,3-cyclohexadiene with 2,4-dimethyl-1,4-cyclohexadiene at a temperature in the range of from about 100° C. to about 175° C. in n-pentane and recovering the resultant polycyclic dienic compound by conventional means of separation such as crystallization, filtration, distillation, extraction, washing, drying, etc.

Other objects and embodiments will be found in the following further detailed description of the present invention.

The temperature of the polymerization reaction is controlled in a range of from about 100° C. to about 175° C. while the polymerization is effected thermally. The variance of the temperature of the polymerization reaction and the variance of the hereinafter set forth molar reactant ratios will be determinative of the physical state of the recovered cyclic dienic polymerization product. The resultant cyclic dienic polymerization product will appear as a liquid, where the temperature is maintained at the upper end of the temperature range, a viscous honey-like material or a solid, where the temperature is maintained at the lower end of the temperature range, the polymerization chain comprising a polynuclear structure.

Examples of suitable conjugated cyclic dienes which may be used as one of the starting materials in the thermal process of the present invention will be those which contain from five up to about 10 carbon atoms in the ring. Some specific examples of these conjugated cyclic dienes will include but are not limited to 1,3-cyclopentadiene and its homologs such as the methylcyclopentadienes, 1,3-cyclohexadiene and its homologs such as the methylcyclohexadienes, 1,3-cycloheptadiene, 1,3-cyclooctadiene, 1,3-cyclononadiene, 1,3-cyclodecadiene, etc. Examples of suitable non-conjugated cyclic dienes which may be used as the other of the starting materials in the thermal process of the present invention will be those which contain from six to about 10 carbon atoms in the ring and substituted derivatives thereof. Some specific examples of these non-conjugated cyclic dienes will include but are not limited to 1,4-cyclohexadiene, 1-methyl-1,4-cyclohexadiene, 3-methyl-1,4-cyclohexadiene, 2,4-dimethyl-1,4-cyclohexadiene, 1,2-dimethyl-1,4-cyclohexadiene, 1-methoxy-1,4-cyclohexadiene, 1,3-dimethoxy-1,4-cyclohexadiene, 2-chloro-1,4-cyclohexadiene, 2-chloro-3-methyl-1,4-cyclohexadiene, 1,4-cyclooctadiene 1-methyl-1,4-cycloheptadiene, 3-methyl-1,4-cycloheptadiene, 1,3-dimethyl-1,4-cycloheptadiene, 1-methoxy-1,4-cycloheptadiene, 1,3-dimethoxy-1,4-cycloheptadiene, 1-chloro-1,4-cycloheptadiene, 1-chloro-3-methyl-1,4-cycloheptadiene, 1,4-cyclooctadiene, 1,5-cyclooctadiene, 1-methyl-1,4-cyclooctadiene, 1-methyl-1,5-cyclooctadiene, 2,4-dimethyl-1,5-cyclooctadiene, 1-methoxy-1,4-cyclooctadiene, 1,3-dimethoxy-1,4-cyclooctadiene, 2-chloro-1,4-cyclooctadiene, 2-chloro-3-methyl-1,4-cyclooctadiene, 1,4-cyclononadiene, 1,5-cyclononadiene, 1-methyl-1,4-cyclononadiene, 1,3-dimethyl-1,4-cyclononadiene, 2-methoxy-1,5-cyclononadiene, 5,6-diethoxy-1,5-cyclononadiene, 1-chloro-1,5-cyclononadiene, 1,4-cyclodecadiene, 1,5-cyclodecadiene, 1,6-cyclodecadiene, 1-methyl-1,4-cyclodecadiene, 1,5-dimethyl-1,4-cyclodecadiene, 2-methoxy-1,5-cyclodecadiene, 1,5-dimethoxy-1,5-cyclodecadiene, 2-chloro-1,6-cyclodecadiene, 1,5-dichloro-1,5-cyclodecadiene, etc. It is understood that the aforementioned conjugated cyclic diene and the non-conjugated cyclic diene compounds are only representative of the class of compounds which may be employed and that the present invention is not necessarily limited thereto.

In a preferred embodiment, the thermal process of this invention is effected in a medium which will comprise an inert solvent such as an aliphatic hydrocarbon, cycloaliphatic hydrocarbon, aromatic hydrocarbon, etc. Some specific examples of these will include but will not be limited to n-pentane, n-hexane, n-heptane, n-octane, 2,2,4-trimethylpentane, 2,3,4-trimethylpentane, 2,2,4-trimethyloctane, cyclopentane, methylcyclopentane, cyclohexane, cycloheptane, cyclooctane, benzene, toluene, etc.

The process of this invention may be effected in any suitable manner and may comprise either a batch or continuous type operation. For example, when a batch type operation is employed, the reactants comprising the conjugated cyclic diene and the non-conjugated cyclic diene are charged in a mole ratio of from about 2:1 to about 50:1 moles of conjugated cyclic diene per mole of non-conjugated cyclic diene to an appropriate apparatus containing an inert medium. The vessel may be either a flask or an autoclave of the rotating or stirred type. The mixture is then heated to a temperature of from about 100° to about 175° C. for a predetermined residence time, said period of reaction being from about 0.5 to about 16 hours or more in duration. At the end of this time, heating is discontinued, the apparatus is allowed to return to room temperature and the polycyclic dienic compound is then recovered from the mixture by a conventional means of purification and separation, said means including washing, drying, extraction, evaporation, fractional distillation, etc.

It is also contemplated within the scope of this invention that the thermal reaction process for obtaining the polycyclic dienic compounds may be effected in a continuous manner of operation. When such a type of operation is employed, the reactants are continuously charged by using the feedstocks of the type hereinbefore set forth to a reactor which is maintained at the proper operating conditions of temperature and pressure. One feedstock comprises a conjugated cyclic dienic compound and the other feedstock comprises a non-conjugated cyclic dienic compound, both feedstocks being charged simultaneously in an inert medium in a molar ratio within the range hereinbefore set forth. The feed stocks are thermally reacted at a temperature of from about 100° to about 175° C. for a residence time sufficient to effect polymerization. After completion of polymerization, the reactor effluent is continuously withdrawn and subjected to a conventional means of separation such as washing, drying, filtration, extraction, evaporation, fractional distillation, etc., whereby the polycyclic dienic compounds are separated and recovered, the unreacted starting materials being recycled to form a portion of the feedstocks.

The following examples are given to illustrate the process of this invention which, however, are not intended to limit the generally broad scope of the present invention in strict accordance therewith.

EXAMPLE I

In this example fifteen moles of 1,3-cyclopentadiene and one mole of 1,4-cyclohexadiene in five liters of n-octane are heated to 125° C. in a rotating autoclave. The rotating autoclave is occasionally cooled to maintain a vigorous but controlled reaction rate. After six hours of reaction, during which the mixture becomes highly viscous, the rotating autoclave is cooled and the n-octane along with other low boiling materials and unconverted 1,3-cyclopentadiene are removed by evaporation under a high vacuum. The residual product is a light-colored, highly viscous honey-like material having a weight of about 900 atomic mass units which is soluble in hydrocarbons.

EXAMPLE II

In this example a mixture of seventeen moles of 1,3-cyclohexadiene and one mole of 1,5-cyclooctadiene in seven liters of benzene is heated to 115° C. in a rotating autoclave. The rotating autoclave is occasionally cooled to maintain a vigorous but controlled reaction rate. After six hours of reaction during which the mixture becomes highly viscous, the autoclave is cooled and the benezene along with other low boiling materials and unconverted 1,3-cyclohexadiene are removed by evaporation under a high vacuum. The residual product is a light-colored, highly viscous honey-like material weighing about 1100 atomic mass units which is soluble in hydrocarbons.

EXAMPLE III

In this example a mixture of twenty five moles of 1,3-cyclopentadiene and one mole of 2,4-dimethyl-1,4-cyclohexadiene in twenty five liters of n-pentane is heated to 138° C. in a rotating autoclave. The rotating autoclave is occasionally cooled to maintain a vigorous but controlled reaction rate. After six hours of reaction during which the mixture becomes highly viscous, the autoclave is cooled and the n-pentane along with other low boiling materials and unconverted 1,3-cyclopentadiene are removed by evaporation under a high vacuum. The residual product is a light-colored, highly viscous honey-like material weighing about 1400 atomic mass units which is soluble in hydrocarbons.

I claim as my invention:

1. A process for the preparation of a polymeric polycyclic dienic hydrocarbon which comprises thermally and non-catalytically polymerizing, at a temperature of from about 100° to about 175° C., a conjugated cyclic diene hydrocarbon containing from five to about 10 carbon atoms in the ring with a non-conjugated cyclic diene hydrocarbon containing from six to about 10 carbon atoms in the ring in a mole ratio of from about 2:1 to about 50:1 moles of the conjugated cyclic diene hydrocarbon per mole of the non-conjugated cyclic diene hydrocarbon, and recovering the resultant polymerized cyclic dienic hydrocarbon.

2. The process of claim 1 further characterized in that the conjugated cyclic diene is a 1,3-cyclopentadiene or a 1,3-cyclohexadiene and the non-conjugated diene is a 1,4-cyclohexadiene or a 1,5-cyclooctadiene.

3. The process of claim 1 further characterized in that the conjugated cyclic diene is 1,3-cyclopentadiene.

4. The process of claim 1 further characterized in that the conjugated cyclic diene is 1,3-cyclohexadiene.

5. The process of claim 1 further characterized in that the non-conjugated cyclic diene is 1,4-cyclohexadiene.

6. The process of claim 1 further characterized in that the non-conjugated cyclic diene is 1,5-cyclooctadiene.

7. The process of claim 1 further characterized in that the non-conjugated cyclic diene is 2,4-dimethyl-1,4-cyclohexadiene.

8. The process of claim 1 further characterized in that the polymerization reaction is effected in a medium consisting of an inert hydrocarbon.

9. The process of claim 8 further characterized in that the inert hydrocarbon is normal octane.

10. The process of claim 8 further characterized in that the inert hydrocarbon is benzene.

* * * * *